United States Patent [19]

Hein, III et al.

[11] 4,228,215

[45] Oct. 14, 1980

[54] LAMINATE INCLUDING FLUID COMPRESSION ROLLED POLYMER

[75] Inventors: Carl C. Hein, III, Neenah, Wis.; Russell J. Lempke, Cleveland, Ohio; Harold K. Silver; Joseph J. Spitz, both of Neenah, Wis.; Don W. Seidler, Appleton, Wis.

[73] Assignee: American Can Company, Greenwich, Conn.

[21] Appl. No.: 920,710

[22] Filed: Jun. 30, 1978

[51] Int. Cl.² ............... B32B 7/02; B32B 27/32; B32B 27/40

[52] U.S. Cl. .................. 428/216; 206/484; 428/72; 428/178; 428/188; 428/516; 428/518; 428/520; 428/910; 428/424.4; 428/424.6; 428/424.8

[58] Field of Search ............. 428/72, 178, 188, 425, 428/520, 518, 216, 910, 516, 424; 206/484

[56] References Cited

U.S. PATENT DOCUMENTS

| 3,294,387 | 12/1966 | Chavannes ............... 428/178 X |
| 3,504,075 | 3/1970 | Williams, Jr. et al. ......... 264/175 |

FOREIGN PATENT DOCUMENTS 1433339  4/1976  United Kingdom ............... 428/72

*Primary Examiner*—Ellis P. Robinson
*Attorney, Agent, or Firm*—Robert P. Auber; George P. Ziehmer; Thomas D. Wilhelm

[57] ABSTRACT

A biaxially tearable, moisture barrier laminate is comprised of a film of fluid compression rolled polymer, and a film of heat seal material. The laminate is especially suited for use in the production of strip packages.

10 Claims, 2 Drawing Figures

LAMINATE INCLUDING FLUID COMPRESSION ROLLED POLYMER

BACKGROUND OF THE INVENTION

Fluid compression rolled (FCR) polymeric films are disclosed in Williams, Jr., et al. U.S. Pat. No. 3,504,075; such films exhibit a most advantageous combination of properties, including clarity, tensile strength, moisture barrier characteristics, etc. While the disclosure of that patent is hereby incorporated by reference hereinto, it might be pointed out it teaches a technique for cold rolling a polymeric sheet or film to effect a substantial thickness reduction wherein a lubricant is utilized to produce a hydrodynamic wedge in the nips between the rollers and the polymeric web. This produces molecular orientation of the polymer in the machine (longitudinal) direction which, in turn, is responsible for at least some of the outstanding properties exhibited by the film.

Although such films are highly desirable for many uses, certain characteristics which they possess, and which are attendant to the linearity produced by compression rolling, render them impractical, or at least somewhat undesirable, for some packaging applications. More specifically, the high clarity and low moisture vapor transmission rates (MVTR) which typify these films make them uniquely suited for the packaging of moisture-sensitive comsumer items, such as pharmaceuticals (e.g., pills, capsules, and the like). Those items are desirably sold in strip packages, in which each pill is individually encased within a pocket or cell formed by producing a series of lateral and transverse seals (normally heat seals) along the length and across the width of two coextensive films.

While such oriented films are generally heat sealable, the tendency for deorientation to occur at elevated temperatures, on the one hand, coupled with the necessity for achieving certain minimum sealing temperatures, on the other, often confine operating temperatures to a range which is too narrow for practical purposes (e.g., 15 Fahrenheit degrees). Thus, the dimensional changes which occur upon excessive deorientation at overly elevated temperatures will so stress and distort the seal areas as to make the bond strength attained inadequate, at best; the same result will occur if insufficient heat is provided at the seal areas for adequate fusion.

A second source of difficulty resides in the weakening that is induced in the cross-machine direction of the film (i.e., the direction transverse to the axis of orientation), which tends to cause splitting, especially adjacent the longitudinally extending lateral seal areas. Loss of integrity of the package is, of course, intolerable, and the problem is particularly troublesome when the item packaged is large relative to the size of its cell, due to the stresses which are thereby produced.

Finally, whereas it is typically quite easy to tear a compression rolled film in the machine direction, the same molecular orientation which is responsible for that effect also produces a commensurate resistance to tearing in the transverse direction. Hence, when such films are used for strip packages, the practical consequences are that the cells may be separated from one another or opened manually in one direction, but not in the other. This factor is, of course, of primary importance to such an application, since the inability to easily tear one unit from the remainder of the strip would virtually preclude consumer acceptance of such a package.

Accordingly, it is a primary object of the present invention to provide a novel film, which exhibits desirable moisture barrier, heat sealing and biaxial tearing characteristics, coupled with such levels of tensile strength and elongation as will prevent undue splitting of the web and will permit its use in connection with conventional packaging machinery.

More specific objects are to provide a film which is adapted for use in the fabrication of strip packages, to provide such packages, and to provide methods by which such a film and such a package may be produced.

SUMMARY OF THE DISCLOSURE

It has now been found that certain of the foregoing and related objects of the invention are readily attained in a biaxially tearable laminate having a low moisture vapor transmission rate, comprising a fluid compression rolled, uniaxially oriented base film about 0.5 to 2.5 mils thick, and a substantially unoriented heat seal film of synthetic resinous polymer bonded to the base film, in a thickness ratio of heat seal film to base film of about 0.5–1.5:1.0. The base film is comprised of at least a major proportion of high density polyethylene, and it has, in the direction of the axis of orientation, a tensile strength of at least about 15,000 pounds per square inch, an elongation value of less than about 150 percent, and a tear strength of about 5 to 100 grams. In the direction transverse to the direction of orientation, the base film has a tensile strength of about 2000 to 6000 pounds per square inch, an elongation value of less than about 75 percent, and a tear strength greater than about 500 grams; it has a moisture vapor transmission rate of less than 0.2 gram per 100 square inches per 24 hours. The heat seal film has a sealing temperature which is significantly less than that of the base film, and which is below the temperature at which substantial deorientation occurs therein. The heat seal film has also tensile strength of less than about 12,000 pounds per square inch, and an elongation value of at least 75 percent. The resultant laminate has, in the base film orientation direction, a tensile strength of at least about 11,000 pounds per square inch and a tear strength of less than about 175 grams; in the base film transverse direction it has an elongation value of at least about 100 percent and a tear strength of less than about 450 grams; and it has a moisture vapor transmission rate of less than about 0.2 gram per 100 square inches per 24 hours.

In the preferred embodiment, the base film of the laminate has, in the orientation direction, a tensile strength of at least about 25,000 pounds per square inch, an elongation value of less than about 50 percent, and a tear strength of about 10 to 30 grams; in the transverse direction, it has an elongation value of about 15 to 40 percent, and it has a moisture vapor transmission rate of less than about 0.1 gram per 100 square inches per 24 hours. In such a laminate, the heat seal film has an elongation value of about 150 to 800 percent, with the laminate itself having, in the orientation direction, a tear strength of less than about 130 grams and, in the transverse direction, an elongation value of at least about 200 percent and a tear strength of about 200 to 350 grams; the laminate also has a moisture vapor transmission rate of less than about 0.1 gram per 100 square inches per 24 hours.

Certain objects of the invention are attained in a biaxially tearable strip package having a low moisture vapor transmission rate. The package is comprised of two coextensive laminate strips and a plurality of items contained therebetween, with each of the strips being comprised of a laminate including a FCR base film and a heat seal film, as herein defined. In the package, the strips are heat sealed together at longitudinally and transversely spaced locations to define a plurality of cells therein, with at least one of the items contained within each of the cells. The longitudinally extending heat seals are parallel to the axis of orientation of the base film, and the transverse heat seals are perpendicular thereto. Preferably, each of the cells of the strip package will be of pillow-like conformation, and the strips will be of high clarity and of substantial transparency. The package is especially adapted for the packaging of moisture-sensitive pharmaceuticals.

Other objects are attained in a method wherein a web, comprised of at least a major proportion of high density polyethylene, is fluid compression rolled (in accordance with the teachings of the above-identified Williams, Jr., et al. patent) to produce a uniaxially oriented base film about 0.5 to 2.5 mils thick, and having the tensile, elongation, tear strength and moisture vapor transmission characteristics herein described. A substantially unoriented heat seal film of synthetic resinous polymer is bonded to the base film, with a thickness ratio of heat seal film to base film of about 0.5–1.5:1.0. The heat seal film has heat sealing, tensile strength and elongation properties which are also in accordance with the description contained therein. Preferably, the base film will be produced by fluid compression rolling a web to a thickness which is about 15 to 25 percent of its non-compressed gauge, and the base film should be subjected to a temperature sufficiently low to substantially maintain its orientation, during the step of bonding the heat seal film thereto.

DETAILED DESCRIPTION OF THE ILLUSTRATED EMBODIMENT

Figure 1:
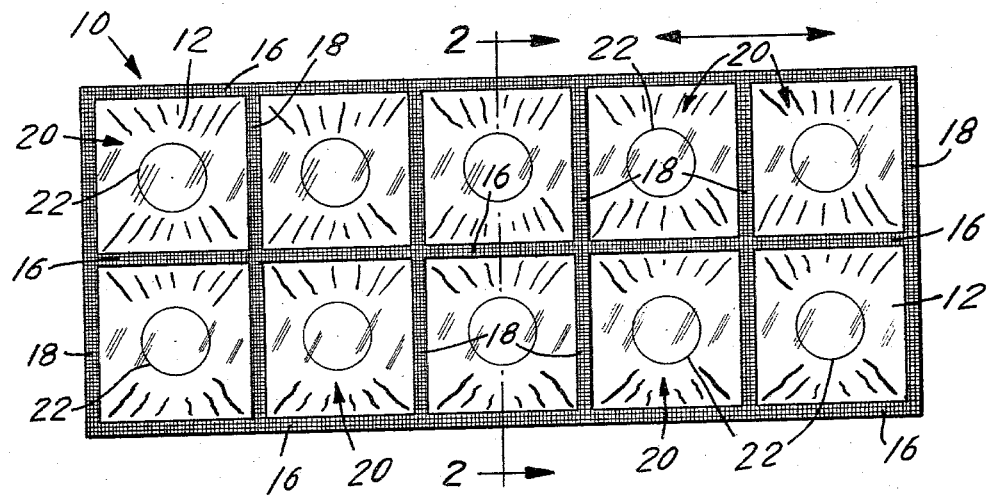
FIG. 1 is a plan view of a strip package embodying the present invention.
Figure 2:
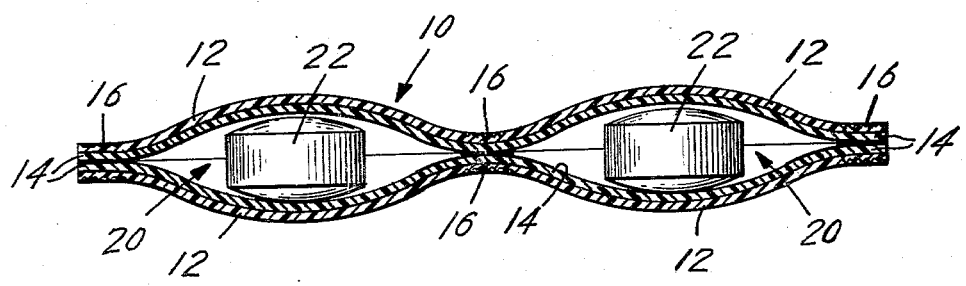
FIG. 2 is a section view, taken along line 2—2 of FIG. 1 and drawn to scale enlarged therefrom.

Turning now in detail to the appended drawing, therein illustrated is a strip package embodying the present invention and generally designated by the numeral 10. The package 10 is fabricated from two webs, each consisting of a base film 12 of FCR polymer, to which is laminated a heat seal film 14. A pattern of longitudinal heat seals 16 and transverse heat seals 18 divides the package 10 into ten pockets or cells 20, within each of which is encased a pill 22. As will be noted, each cell 20 is of pillow-like conformation, due to shrinkage which occurs in the longitudinal or machine direction of the films 12 (designated by the double-headed arrow), as a result of the modest amount of deorientation that is caused by the heat employed in the production of the seals.

DETAILED DESCRIPTION OF THE PREFERRED EMBODIMENTS

As indicated hereinabove, the base layer of the laminate web which is the subject of the present invention is produced in accordance with the teachings of Williams, Jr., et al. U.S. Pat. No. 3,504,075, and any of the films so produced may be employed in the practice of this invention, so long as they conform to the moisture barrier, tensile strength and elongation characteristics which are herein set forth. Nevertheless, the preferred resin for use as the base film is high density polyethylene (ASTM D-1248 type 3), FCR films of that composition being available under the trademark BARTUF 3 from American Can Company, of Greenwich, Conn. Somewhat less desirable (largely from an economic standpoint) but still highly satisfactory are FCR films which include a second polymer layer coextruded with a predominant amount of high density polyethylene (HDPE) and conjointly compression rolled therewith. Examples of such films are HDPE/low density polyethylene, and HDPE/ethylene-vinyl acetate copolymer coextrusions, which are respectively commercially available from American Can Company under the designations BARTUF 31 and BARTUF 36. Compression rolled coextrusions of HDPE with ethylene-vinyl alcohol copolymer and nylon (polyamide) resins are further examples of suitable films for use as the base layer. Generally, the most suitable films will be produced by reduction of the thickness of the starting web (through compression rolling) to a value which is about 15 to 25 percent of the initial caliper.

The HDPE-containing films are preferred because they offer an optimum combination of moisture barrier properties, compatibility with heat sealing resins which, in cooperation therewith, provide ideal heat sealing qualities, machine-direction tensile strength and elongation characteristics, and relatively low cost. As regards moisture barrier properties, to be suitable for use in packaging moisture-sensitive items, such as for the pharmaceutical industry, the base film should have a MVTR (as determined by ASTM E-96, which is the basis employed throughout the present specification for that determination) of less than 0.2 gram per 100 square inches per 24 hours; preferably, the rate will not exceed 0.1 gram per 100 square inches per 24 hours, and most desirably it will be 0.08 gram or lower. It should be appreciated that the MVTR of the laminate web will be essentially that of the base film, since the contribution from the sealing film to moisture barrier protection will not generally be great, although significant in some cases.

Similarly, the tensile strength and elongation characteristics of the laminate will be afforded essentially by the base film. To ensure that the web can be run effectively on conventional packaging equipment, those values (in the base film) should be at least about 15,000 pounds per square inch, and less than about 150 percent, respectively; preferably the tensile strength will be 25,000 pounds per square inch, or higher (a value of about 45,000 psi being most desirable), and the elongation value will not exceed 50 percent. The linearity of molecular orientation in the machine direction, which contributes so significantly to its axial strength, is also believed to be accountable for the high resistance which the film offers to tearing in the cross-machine direction. Generally the FCR films employed herein will have cross-machine Elmendorf (notched) tear strengths of at least 500 grams (as determined by ASTM-D1922), and in most instances the values will be considerably higher. It should be appreciated that strengths of more than 500 grams are considered to be excessive from the standpoint of manual tearing, with values in the range 350 to 450 grams being regarded to reflect more or less difficult severance.

The base film will, on the other hand, be relatively weak in the transverse direction, typically exhibiting tensile strengths in the range of about 2000 to 6000 pounds per square inch. Their percentage of elongation will usually fall within the range of about 15 to 40, with 75 percent representing about the upper limit. It is, of course, this relative weakness in the cross machine direction which gives rise to the film-splitting problem. By the same token, it also accounts for the ease with which a package made from the film may be opened and/or divided. Its tear strength in that direction will generally be about 5 to 100, and preferably about 10 to 30 grams; most typically, it will have a value of about 15 grams (expressed, as in all instances herein, as Elmendorf tear strengths).

So long as they satisfy the criteria set forth herein and are compatible with the base film, any of the numerous synthetic thermoplastic heat seal resins that are known in the art may be employed, including the olefin polymers and copolymers, halogenated vinyl and vinylidene polymers and copolymers, the vinyl alcohols and esters and copolymers thereof, etc. The preferred resins are the ionomers sold by E. I. Du Pont de Nemours and Company of Wilmington, Del. under the trademark SURLYN, ethylene-vinyl acetate copolymers (typically containing about 4.5 to 9.0 weight percent of vinyl acetate monomer), ethylene-acrylic acid copolymers (typically containing about 3.5 to 8.5 weight percent of acrylic acid monomer), low density polyethylene, vinyl chloride and vinylidene chloride polymers and copolymers (e.g., Dow Chemical Company's SARAN resins) and mixtures of the foregoing. The heat seal film will be substantially unoriented; that is, its orientation will be of the melt-oriented type, typified by blown, chill roll cast or extrusion coating films, if any.

Insofar as heat sealing is concerned, the heat seal film should be sealable to itself, with adequate hot-tack, at a temperature below that at which the base film deorients substantially, and significantly below the fusion temperature thereof. It is, of course, not feasible to assign absolute values to these temperatures, due to subjectivity of defining good sealing and the many contributing variables, which are dependent upon a variety of factors such as machine characteristics, sealing pressures, sealing element areas, film thicknesses, residence times, and the like. However, the greater the differential between the heat sealing temperature of the heat seal films and the temperatures of fusion and deorientation of the FCR film, the more likely will be the prospect that a secure and sound heat seal will be produced under practical operating conditions. This is due not only to the greater latitude of temperature variation that may be tolerated and the positional stability of the unfused base film under the heat sealing element, but also to the fact that undue, stress-creating distortion of the web will be avoided. Of course, it should be born in mind that some deorientation may be desirable to produce the slight pillow-like conformation illustrated, such as will further minimize the levels of stress imposed on the films and the seal areas.

The sealing film should have a tensile strength in the range of about 1,200 to 12,000 pounds per square inch, with a value of about 8,000 being most typical. It will have an elongation percentage of at least 75; preferably, it will range from about 150 to 800 percent, and will most typically be from about 200 to 600 percent. In terms of tear strength, the value may be as low as 20 grams and as high as 700 grams, although the preferred range is from about 70 to 350 grams. While, as has been stated previously, the heat seal film will be substantially unoriented, in a film produced by blowing (such as an ethylene-vinyl acetate copolymer) some orientation may occur. With such a film, the tear strength in the machine direction is preferably from about 350 to 500 grams, and in the transverse direction preferably about 250 to 350 grams, although it may be as high as 450 grams.

Notwithstanding that the term "film" is used herein to describe the heat seal component of the laminate, it should be understood that that component need not be provided as a separate web for application to the base film, and that the term is intended to encompass coatings which are, for example, extruded thereupon. In that case, the heat seal resin would be deposited into the nip of rolls through which the base film is simultaneously passed, at least one of the rolls being chilled to quickly cool the base film so as to prevent undue deorientation from occurring therein; tension on the film might additionally be used to achieve the same end.

Alternatively, and in accordance with the preferred embodiment, a separate web of the heat sealing resin may be secured to the base film with an adhesive. Typical adhesives which are suitable for this purpose are the two-component polyester and polyurethane systems, although other bonding agents may be employed, and the choice thereof will be evident to those skilled in the art. Normally, the adhesive will be employed in an amount sufficient to provide a coverage of about 1.0 to 2.5 pounds per 3000 square feet (ream), with 2.0 pounds per ream generally being optimum. Pretreatment of the polyethylene surface, such as by corona discharge or with an appropriate primer, will generally be effected to ensure maximum bond strength, and to minimize any possibility of delamination.

A web of the heat sealing resin may also be secured to the base sheet by extrusion bonding, whereby a molten thermoplastic resin is extruded between the two films in the nip of pressure rollers through which the films are passed, again with a cooling effect to preserve orientation of the base sheet. The composition of the bonding resin may advantageously be distinct (in chemical composition, molecular weight, etc.) from that of either of the two films, with the specific choice being dependent thereon and upon the ultimate properties desired in the final laminated web, as will be evident to those skilled in the art. By way of example, the extruded intermediate resin may typically be a low density polyethylene, an ionomer, an ethylene-acrylic acid copolymer, or the like. Regardless of whether it is applied as a bonding agent or as an external layer, moreover, other polymers may be included in the laminate for specific purposes; thus, films of vinyl chloride-polyvinylidene chloride copolymer (e.g., SARAN), polyvinyl alcohol or ethylene-vinyl alcohol copolymer may be added to afford oxygen barrier properties to the structure.

Generally, the optimum caliper of the barrier film in a laminate intended for strip packaging will be about 1.0 to 1.5 mils, although film about 0.5 to 2.5 mils may be well-suited for certain purposes. The sealant film will usually be employed in a thickness about one-half to one and one-half that of the base film, with approximately equal thickness being preferred in most cases, depending upon the desired properties and the characteristics of the particular films involved.

The tensile strength of the composite laminated web will be essentially that of the base film, although the heat seal film may contribute some strength, as well. Normally, the laminate web will have a longitudinal tensile strength of at least about 11,000 pounds per square inch, and a cross-machine direction value of about 2,000 to 5,000, with 3,000 pounds per square inch being preferred. It should be appreciated that the tensile strength of the web will normally have a lower numerical value than that of the base film employed therein, due to the fact that the units of tensile strength include a thickness factor; the amount of stress that can actually be borne by the laminate will be at least as great as that which can be resisted by the base film. As regards elongation, the laminate should have a minimum amount of stretch in the machine direction (ideally none), and a maximum amount in the cross machine direction (at least about 100 percent, and preferably no less than about 200 percent elongation). Finally, its longitudinal tear strength should not exceed 175 grams, with a maximum of about 130 grams being preferred and with 50 to 75 grams being optimum. In transverse tear strength, the web will exhibit a value of less than about 450, and preferably below 350, grams, with a practical lower limit generally of about 200 grams. It should be appreciated that these tear strength values can be reduced by physically weakening the web (or, more usually, the strip into which it is fabricated), such as by a series of perforations, slits, or the like, provided in the heat seal areas between adjacent cells. However, even though such an expedient may be utilized, transverse tear strengths are still generally found to be excessive in the unlaminated FCR films; moreover, the provision of such weakening structure may, itself, introduce manufacturing and other difficulties. Exemplary of the efficacy of the present invention is the following specific example:

EXAMPLE I

A urethane prepolymer adhesive solution is coated upon the corona discharge-treated side of one mil strips of BARTUF 3 fluid compression rolled high density polyethylene film, in an amount sufficient to provide about one pound of dry adhesive per ream of film. After hot air drying at about 180° Fahrenheit to drive off the solvent, the strips are bonded to similarly dimensioned corona discharge-treated, 1.5 mil strips of heat seal resin films, by introducing the BARTUF film and the heat seal film into the nip of a rubber roll and heated metal roll pair, the nip temperature being about 130° Fahrenheit. The laminates are then cooled to room temperature, wound for curing for a period of 24 to 48 hours, then rewound, slit and tested. The results are recorded in Table One, which is set forth below; parallel data are also provided for one mil strips of unmodified BARTUF 3, for purposes of comparison:

TABLE ONE

| Sealant: | (A) NONE | (B) SURLYN 1601 | (C) CHEMPLEX 3040 |
|---|---|---|---|
| Haze | <3 | 3.6 | 6.0 |
| MVTR | 0.13 | 0.1 | 0.08 |
| Tensile Strength (M.D.) | 35,000 | 14,000 | 13,000 |
| Tensile Strength (T.D.) | 5,000 | 3,200 | 2,500 |
| Elongation (M.D.) | 30 | 50 | 70 |
| Elongation (T.D.) | 30 | 300 | 100 |
| Tear Strength (M.D.) | 15 | 50 | 130 |
| Tear Strength (T.D.) | 500+ | 250 | 230 |
| Minimum Sealing Temp. | 310 | 255 | 250 |

In the foregoing table, SURLYN 1601 is a Du Pont ionomer resin, and CHEMPLEX 3040 is an ethylene-vinyl acetate copolymer containing about 5 percent of vinyl acetate in the molecule, and sold by the Chemplex Company of Rolling Meadows, Ill. Haze is expressed as a percentage, in accordance with ASTM D-1003; MVTR is expressed in grams per 100 square inches per 24 hours, in accordance with ASTM E-96; tensile strengths are in pounds per square inch and elongations are in percentages, both under ASTM D-882; tear strengths are in grams (ASTM D-1922); and the sealing temperatures are in degrees Fahrenheit, as determined in accordance with ASTM F-88. The abbreviation "M.D." refers to the machine or longitudinal direction of the BARTUF film, and "T.D." refers to the transverse or cross-machine direction thereof.

Most notably, it is seen from the data in the Table that the transverse tear strength of the BARTUF FCR film (A) is reduced dramatically by lamination with the heat seal films, rendering the laminate webs (B) and (C) readily severable, by manual means, in the cross-machine direction. While of increased magnitude, the longitudinal tear strengths remain at entirely facile levels; thus, strip packages (such as that of the drawing) produced from either of the laminates would be easily opened for access to the contents, as well as being readily divisible into its individual cells. It will be appreciated that Elmendorf tear strengths are based upon a notched web, and that all of the tear strength data herein are therefore so based. Moreover, as a practical matter, packages made with the laminates of the invention will also be provided with appropriately placed notches. The tensile strengths in the machine direction are entirely suited for machine running of the laminates, and the increase in elongation of the laminates in the transverse direction effectively reduces the tendency for splitting to occur in the webs.

Furthermore, it will be noted that the heat seal films reduce the minimum heat sealing temperature by at least 55 Fahrenheit degrees from that exhibited by the BARTUF film itself, thus permitting sealing over a relatively wide temperature span, reducing the stringency of control necessary and promoting better seals thereby and by minimizing the deorientating effect upon the BARTUF film of exposure to heat. Finally, all of the foregoing benefits are achieved together with improvements in the excellent MVTR value of the base film, and without significant reduction of the outstanding clarity (haze increase) thereof.

For comparative purposes, webs (A) and (C), as well as (D), a 2.5 mil web produced by the fluid compression rolling of a coextrusion of HDPE and ethylene-vinyl acetate (5%) copolymer (HDPE:EVA ratio of about 1:1.5), are subjected to shrinkage in a silicone oil bath by immersion for 15 seconds, the bath being maintained at typical heat sealing temperatures. At 240° Fahrenheit, the laminate web embodying the invention (C) is seen to shrink by only 14 percent, whereas the unlaminated compression rolled HDPE (A) shrinks by about 16 percent, and the FCR coextrusion (D) shrinks about 16.3 percent. More dramatic results are observed at 260° Fahrenheit, where shrinkages of 20 percent (C), 28 percent (A) and 39 percent (D) occur. These results are indicative of the improved heat sealability of the laminates of the invention over unmodified compression rolled homopolymers, and of the dramatic difference that is occasioned by laminating a FCR polymer to an unoriented film, rather than by compression rolling a coextrusion of the same two resins. In any event, the heat sealing temperature of the heat seal layer should be significantly less than that of the base film, a differential of about 30 Fahrenheit degrees (jaw temperature) or more being desirable. The instant laminate webs are ideally suited for fabrication into strip packages on conventional strip packaging machines, wherein the sealing operation is typically effected by a rotating member.

Thus, it can be seen that the present invention provides a novel film, or laminate web, which exhibits desirable moisture barrier, heat sealing and biaxial tearing characteristics, coupled with such levels of tensile strength and elongation as will prevent undue splitting of the laminate and will permit its use in connection with conventional packaging machinery. The web is adapted for use in the fabrication of strip packages, and methods for the production thereof, as well as for the production of the laminate per se, are provided.

For purposes of clarity, perhaps it should be pointed out that, as used herein, the characterizations of strength and weakness relate to the ability of the film or laminate to bear stresses or loads in the directions stated. Thus, tensile strength and elongation in the orientation direction refer to the response of the material to such loads applied along that axis; tear strength in the cross machine direction relates to the ability of the web to resist tearing (or ripping, as opposed to splitting) under forces applied across the orientation axis; and cross-machine weakness, giving rise to longitudinally extending splits, involves the ability of the film to sustain tensile stresses effectively applied along an axis which is, again, transverse to orientation.

Having thus described the invention, what is claimed is:

1. A biaxially tearable laminate having a low moisture vapor transmission rate, comprising:
   (a) a fluid compression rolled, uniaxially oriented base film about 0.5 to 2.5 mils thick comprised of at least a major proportion of high density polyethylene, said base film having, in the direction of the axis of orientation, a tensile strength of at least about 15,000 pounds per square inch, an elongation value of less than about 150 percent, and a tear strength of about 5 to 100 grams, having, in the direction transverse to the direction of orientation, a tensile strength of about 2000 to 6000 pounds per square inch, an elongation value of less than about 75 percent, and a tear strength greater than about 500 grams, and having a moisture vapor transmission rate of less than 0.2 gram per 100 square inches per 24 hours; and
   (b) a substantially unoriented heat seal film of synthetic resinous polymer bonded in full surface contact to said base film in a thickness ratio of heat seal film to base film of about 0.5–1.5:1.0, said heat seal film having a sealing temperature which is significantly less than that of said base film and which is below the temperature at which substantial deorientation occurs in said base film, having a tensile strength of less than about 12,000 pounds per square inch, and having an elongation value of at least 75 percent; said laminate having, in said base film orientation direction, a tensile strength of at least about 11,000 pounds per square inch and a tear strength of less than about 175 grams, having, in said base film transverse direction, an elongation value of at least about 100 percent and a tear strength of less than about 450 grams, and having a moisture vapor transmission rate of less than about 0.2 gram per 100 square inches per 24 hours.

2. The laminate of claim 1 wherein said base film has, in said orientation direction, a tensile strength of at least about 25,000 pounds per square inch, an elongation value of less than about 50 percent, and a tear strength of about 10 to 30 grams, has, in said transverse direction, an elongation value of about 15 to 40 percent, and has a moisture vapor transmission rate of less than about 0.1 gram per 100 square inches per 24 hours; wherein said heat seal film has an elongation value of about 150 to 800 percent, and wherein said laminate has, in said base film orientation direction, a tear strength of less than about 130 grams, has, in said base film transverse direction, an elongation value of at least about 200 percent, and a tear strength of about 200 to 350 grams, and has a moisture vapor transmission rate of less than about 0.1 gram per 100 square inches per 24 hours.

3. The laminate of claim 1 wherein the thickness of said base film and said heat seal film are about equal.

4. The laminate of claim 1 wherein said laminate additionally includes an adhesive material bonding said base and heat seal films together.

5. The laminate of claim 4 wherein said adhesive is selected from the group consisting of two component polyurethane and polyester curing adhesives, low density polyethylene, ionomer resins, and ethylene-acrylic acid copolymers.

6. The laminate of claim 1 wherein said base film consists essentially of polyethylene.

7. The laminate of claim 1 wherein said base film additionally includes a layer of a synthetic resinous polymer selected from the group consisting of low density polyethylene, ethylene-vinyl acetate copolymer, ethylene-vinyl alcohol copolymer, and polyamide resin.

8. The laminate of claim 1 wherein resin of said heat seal film is selected from the group consisting of ethylene-vinyl acetate copolymer, ethylene-acrylic acid copolymer, ionomer resin, low density polyethylene, vinyl chloride and vinylidene chloride polymers and copolymers, and mixtures of the foregoing.

9. The laminate of claim 1 wherein said base film thickness is about 1.0 to 1.5 mils.

10. The laminate of claim 1 additionally including at least a third polymeric film wherein the resin of said third film is selected from the group of polymers consisting of polyvinyl alcohol, ethylene vinyl alcohol and vinyl chloride-polyvinylidene chloride copolymer.

* * * * *